United States Patent
Nishiumi et al.

(10) Patent No.: US 10,014,549 B2
(45) Date of Patent: Jul. 3, 2018

(54) FUEL CELL SYSTEM

(71) Applicant: TOYOTA JIDOSHA KABUSHIKI KAISHA, Toyota-shi, Aichi-ken (JP)

(72) Inventors: Hiroaki Nishiumi, Toyota (JP); Tateki Takayama, Toyota (JP); Toshiyuki Tonuma, Nissin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 327 days.

(21) Appl. No.: 14/932,440

(22) Filed: Nov. 4, 2015

(65) Prior Publication Data

US 2016/0141640 A1    May 19, 2016

(30) Foreign Application Priority Data

Nov. 14, 2014   (JP) .................................. 2014-232043

(51) Int. Cl.
   *H01M 8/2475*    (2016.01)
(52) U.S. Cl.
   CPC ...... *H01M 8/2475* (2013.01); *H01M 2250/20* (2013.01); *Y02T 90/32* (2013.01)
(58) Field of Classification Search
   CPC ..................... H01M 8/2475; H01M 2250/20
   USPC ....................................................... 429/508
   See application file for complete search history.

(56) References Cited

U.S. PATENT DOCUMENTS

| | | | | |
|---|---|---|---|---|
| 2004/0065492 A1* | 4/2004 | Ogawa | ................... | H01M 8/02 180/165 |
| 2005/0255342 A1 | 11/2005 | Lee et al. | | |
| 2006/0046127 A1 | 3/2006 | Ishizuka et al. | | |
| 2006/0113131 A1 | 6/2006 | Kato et al. | | |
| 2009/0101423 A1* | 4/2009 | Jufuku | ..................... | B60K 1/04 180/65.31 |
| 2010/0112412 A1* | 5/2010 | Aoto | ........................ | B60K 1/04 429/515 |
| 2010/0143766 A1* | 6/2010 | Yoshitomi | ........... | H01M 8/2475 429/457 |

(Continued)

FOREIGN PATENT DOCUMENTS

| | | |
|---|---|---|
| CN | 102481831 A | 5/2012 |
| JP | 2000-085375 A | 3/2000 |

(Continued)

OTHER PUBLICATIONS

Ashley, Steven, "Toyota Targets 2015 for First Fuel-Cell Car," http://articles.sae.org/12731/including image http://www.sae.org/dlymagazineimages/12731 18126 ACT.jpg, Jan. 23, 2014.

*Primary Examiner* — Basia Ridley
*Assistant Examiner* — James Erwin
(74) *Attorney, Agent, or Firm* — Finnegan, Henderson, Farabow, Garrett & Dunner LLP

(57) ABSTRACT

A fuel cell system mounted on a vehicle, includes: a fuel cell configured to cause electrochemical reaction between an anode gas and a cathode gas to proceed; and a fuel cell casing that is configured to place the fuel cell therein, wherein the fuel cell casing has a bottom face that is formed in an approximately rectangular shape, the fuel cell casing is positioned such that longitudinal sides of the approximately rectangular shape are parallel to a left-right direction of the vehicle, and the bottom face has a rib that is extended only in a front-back direction of the vehicle is provided on the bottom face.

3 Claims, 7 Drawing Sheets

(56) References Cited

U.S. PATENT DOCUMENTS

2011/0244355 A1    10/2011   Skala
2012/0021301 A1    1/2012   Ohashi
2013/0017470 A1    1/2013   Hotta et al.

FOREIGN PATENT DOCUMENTS

JP       2000-221855    8/2005
WO    WO 2013-008315    1/2013

\* cited by examiner

FUEL CELL SYSTEM

CROSS-REFERENCE TO RELATED APPLICATION

This application claims priority to Japanese Patent Application No. 2014-232043 filed on Nov. 14, 2014, the entire contents of which are incorporated by reference herein.

BACKGROUND

Field

The present invention relates to a fuel cell system.

Related Art

It is known heretofore to use a fuel cell as a power source of a vehicle. The fuel cell includes a fuel cell stack. The fuel cell stack is made up by stacking a plurality of fuel-cell unit cells and then fixing the stack with holts or the like from their both sides. However, when a shock is applied to the fuel cell as an example, force with which the fuel-cell unit cells are fixed may temporarily lower below an internal pressure of the fuel cell stack. As a result, liquids such as a refrigerant liquid flowing a refrigerant flow path and a generated water accumulating in a reactant gas flow path may leak out of the fuel cell stack.

Normally, the fuel cell stack is mounted on a vehicle as it is housed in a fuel cell casing. The fuel cell casing is sealed for purposes of heat reservation in its inside as well as for prevention of intrusions of foreign matters from its outside. Therefore, a liquid which has leaked out of the fuel cell stack may reside in the fuel cell easing and flow over an unexpected range, causing short-circuits or current leakage.

In order to solve these and other problems, there is a technique, as a related art, of forming a plurality of grooves which extend longitudinally and laterally, respectively, i.e. extend in a grid-like shape, on an upper surface of a bottom face of the fuel cell, casing (e.g., JP 2006-221855 A). As a result of this, liquid can be accumulated in those grooves.

SUMMARY

However, with the technique of JP 2008-221855 A, protruded portions corresponding to recessed portions in the upper surface as the grooves are formed in a lower surface of the bottom face of the fuel cell casing so as to obtain a generally constant plate thickness of the bottom face of the fuel cell casing. Since these protruded portions extend longitudinally and laterally, respectively, the vehicle, when running in flooded places, may suffer a problem that the protruded portions orthogonal to a vehicle's progressional direction is affected by pressure of water that has intruded into the vehicle, as it would be the case conventionally. Also, it has conventionally been desired that the fuel cell casing be improved in rigidity.

Solution to Problem

The present invention, having been accomplished to solve at least part of the above-described problems, can be implemented in the following aspects.

(1) In one aspect of the invention, there is provided a fuel cell system mounted on a vehicle. The fuel cell system includes: a fuel cell configured to cause electrochemical reaction between an anode gas and a cathode gas to proceed; and a fuel cell casing that is configured to place the fuel cell therein, wherein the fuel cell casing has a bottom face that is formed in an approximately rectangular shape, the fuel cell easing is positioned such that longitudinal sides of the approximately rectangular shape are parallel to a left-right direction of the vehicle, and the bottom face has a rib that is extended only in a front-back direction of the vehicle is provided on the bottom face. According to this aspect, by virtue of the rib provided along the front-back direction of the vehicle, when the vehicle rims on an immersed path, a possibility that the fuel cell easing may be affected by pressure of water that has intruded into the vehicle can be suppressed. Also, the fuel cell easing is so positioned that longer sides of its generally rectangular shape are directed along the left-right direction of the vehicle. Therefore, by virtue of the rib extending along the shorter sides, rigidity of the fuel cell casing in the up-and-down direction can be improved, as compared with cases where the rib extends along the longer sides or where the ribs are provided in a grid-like shape.

(2) In the fuel cell system of the above-described aspect, the fuel cell casing may comprise a plurality of members including a member having the bottom face, the member having: a first hole that is used to fix the member to another member of the fuel cell casing; and a second hole that is a hole other than the first hole and is used to position the member relative to the another member of the fuel cell casing. In a case where the hole to be used for the fixation and the hole to be used for the positioning are of the same hole, there is a possibility that using the hole, which has been used for the positioning, for the fixation with use of the fixing jig may be forgotten. However, according to this aspect, such a possibility can be prevented.

(3) In the fuel cell system of the above-described aspect, the member having the bottom face and the another member of the fuel cell casing may be fixed to each other by a bolt with a plain washer or a holt with a conical spring washer. According to this aspect, an extent to which at least one of the member having the bottom face and the another member of the fuel cell casing is scraped off during the tightening of the holt can be reduced.

The present invention may be implemented in various forms. For example, the invention can be implemented in such forms as fuel cell system manufacturing methods, computer programs for implementing such manufacturing methods, recording mediums with those computer programs recorded thereon, and the like.

BRIEF DESCRIPTION OF DRAWINGS

FIG. 8 is an explanatory view of a positioning method;

DESCRIPTION OF EMBODIMENTS

A. Embodiment

Figure 1:
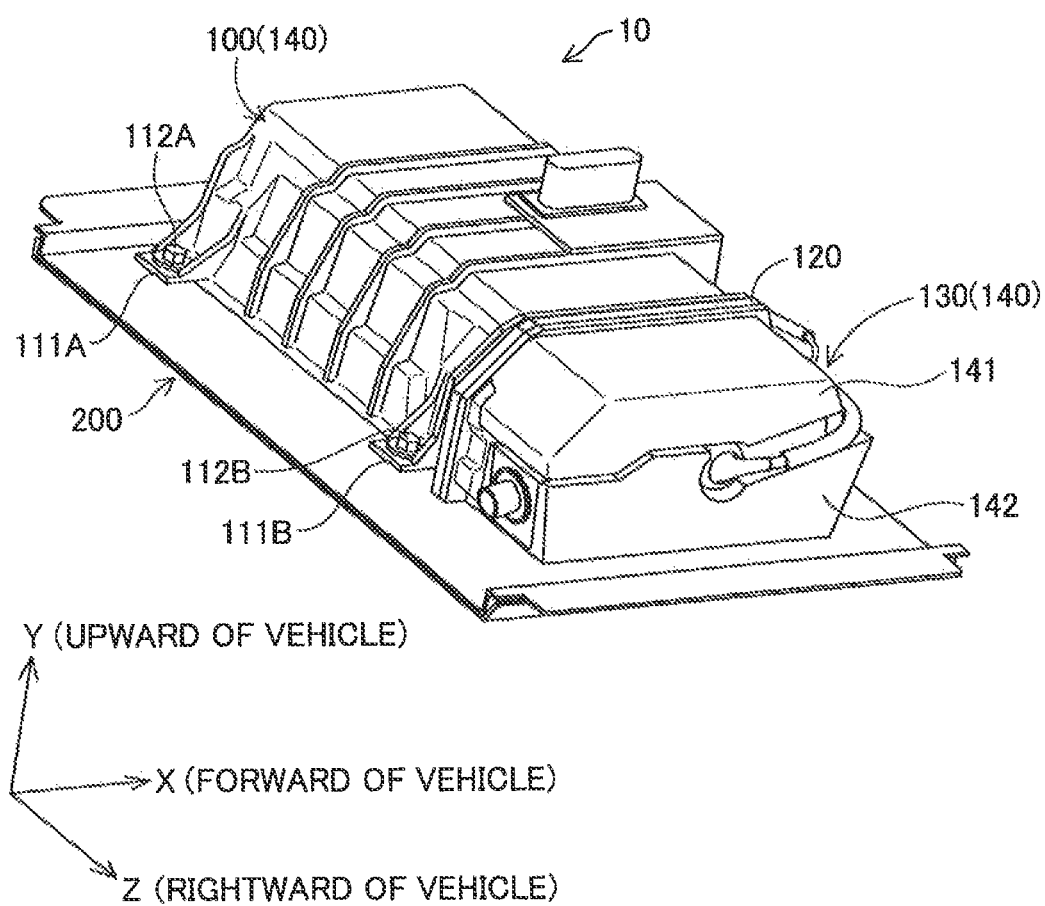
FIG. 1 is an appearance view of a fuel cell system to be used in one embodiment of the present invention.

FIG. 1 is an appearance view of a fuel cell system 10 to be used in one embodiment of the invention. The fuel cell system 10 includes a fuel cell system casing 140 and a frame 200. The fuel cell, system 10 is mounted on a vehicle. In this embodiment, the fuel cell system 10 is provided under a vehicle interior in which a driver is to be accommodated. Referring to FIG. 1, an X-axis positive direction represents a forward direction of the vehicle, a Y-axis positive direction represents an upward direction of the vehicle, and a Z-axis positive direction represents a rightward direction of the vehicle. The XYZ-axes are similarly applicable also to the drawings subsequent to FIG. 1.

The fuel cell system casing 140 includes a fuel cell casing 100 and an auxiliary machinery casing 130. Individual members in the fuel cell system casing 140 are sealed from one another by gaskets so as to prevent foreign matters such as water and dust from intruding inside.

The fuel cell produces electrochemical reaction between hydrogen gas as an anode gas and oxygen gas as a cathode gas. The fuel cell casing 100 has a fuel cell housed therein. The fuel cell is made up by stacking fuel-cell unit cells. The fuel-cell unit cells are stacked in a left-right direction of the vehicle (Z-axis direction).

The auxiliary machinery casing 130 houses therein a plurality of auxiliary machines (not shown) to be used for the fuel cell. In this case, the plurality of auxiliary machines are exemplified by a hydrogen pump, an injector, an exhaust/drain valve, valves, sensors or the like. In addition to the auxiliary machines, piping for cooling water, wiring lines for supplying electric power to the individual auxiliary machines, and the like are also provided in the auxiliary machinery casing 130.

Surfaces of the auxiliary machinery casing 130 are covered with NV (Noise Vibration) covers 141, 142 to suppress outward conduction of vibrations and noise generated from the auxiliary machines (see FIG. 1). In this embodiment, the NV covers 141, 142 each have an outer layer formed from hard resin and an inner layer formed from urethane foam.

In this embodiment, a plurality of auxiliary machines are fixed to a plate-shaped manifold 120. Also, a side face of the auxiliary machinery casing 130 on a left side (Z-axis negative direction side) of the vehicle is covered with the manifold 120. The manifold 120 defines flow paths for hydrogen gas, oxygen gas and cooling water that cools the fuel cell. Also, the manifold 120 has a function of securing insulation from high-voltage components in the fuel cell casing 100 as well as a function of compressing fuel-cell unit cells to one another.

The frame 200 is provided at an underside of the fuel cell system casing 140. The frame 200 serves to fix the fuel cell system casing 140, which is effectuated by inserting bolts 112A, 112B into bosses 111A, 111B, respectively, formed in the fuel cell casing 100 of the fuel cell system casing 140. For reduction of vibrations, a rubber vibration insulator is provided between the fuel cell system casing 140 and the frame 200. Then, the frame 200 is tightened to an unshown vehicle body.

Figure 2:
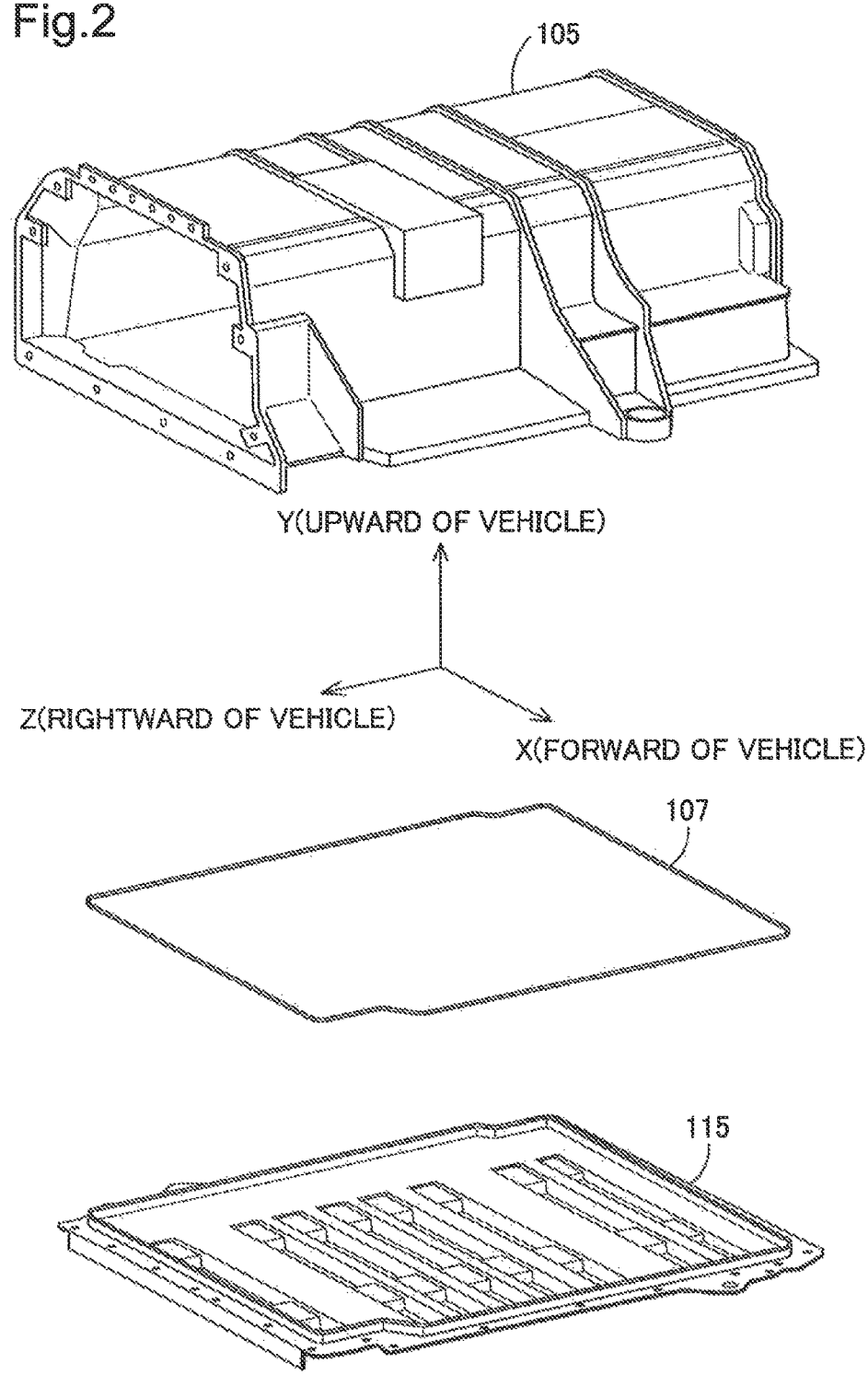
FIG. 2 is an exploded perspective view showing a fuel cell casing.

FIG. 2 is an exploded perspective view showing the fuel cell casing 100. The fuel cell casing 100 is made up of a plurality of members. The fuel cell casing 100 includes a plate-shaped manifold 120 for covering a side face of the fuel cell, on the right side (Z-axis positive direction side) of the vehicle (see FIG. 1), a stack casing 105 for covering side faces of the fuel cell other than the vehicle right-side (Z-axis positive direction-side) side face of the fuel cell as well as its top face, and a lower cover 115 for covering a bottom face of the fuel cell. The lower cover 115 is a member including a bottom face of the fuel cell casing 100. A gasket 107 is provided between the stack casing 105 and the lower cover 115. The gasket 107 makes it possible to prevent foreign matters such as water and dust from intruding to inside of the fuel cell casing 100.

Figure 3:
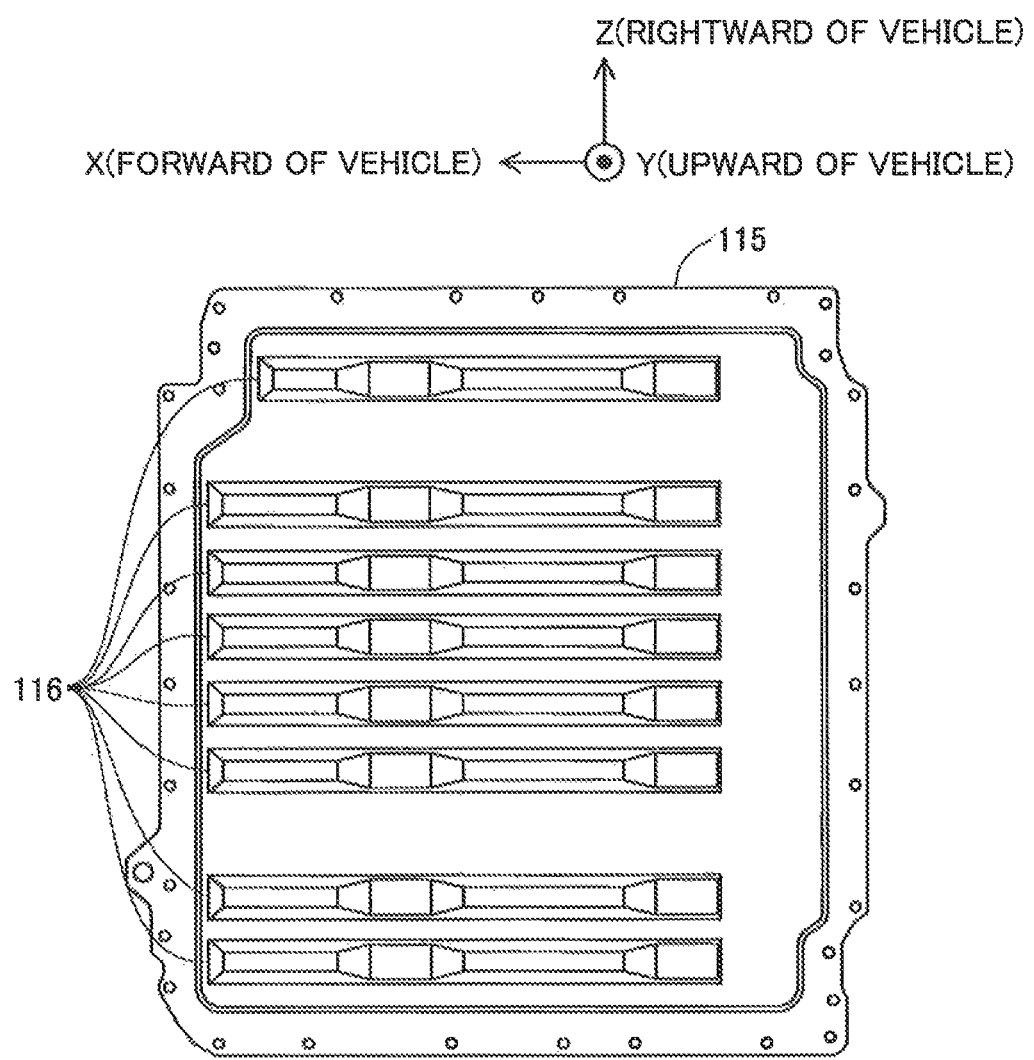
FIG. 3 is a view showing a lower cover.

FIG. 3 is a view showing the lower cover 115. As can be seen from FIG. 3, the lower cover 115 is provided with ribs 116 extending only along a front-back direction of the vehicle (X-axis direction). That is, the ribs 116 extending only along the front-back direction of the vehicle are provided on the bottom face of the fuel cell casing 100. In other words, surfaces between one rib 116 and another rib 116 extend along the front-back direction of the vehicle. With such an arrangement, when the vehicle runs on an immersed path, pressure that the vehicle receives from water being in contact with the bottom face of the fuel cell casing 100 can be reduced, as compared with cases where the ribs 116 extend along the left-right direction of the vehicle (Z-axis direction).

Also, for example, when the vehicle runs on a bad road or when the bottom face of the vehicle body rubs against the road surface, the bottom face of the fuel cell casing 100 receives a force directed from lower toward upper side and another force directed from front toward rear side. However, by the provision of the ribs 118 extending only along the front-back direction of the vehicle, the fuel cell casing 100 can be prevented from being deformed.

The lower cover 115 is formed into a generally rectangular shape. In other words, the bottom face of the fuel cell casing 100 is formed into a generally rectangular shape. It is noted here that the term 'generally rectangular shape' refers to a shape having one set of shorter sides and one set of longer sides, where its corners may be round or part of the sides may be curved.

The fuel cell casing 100 is so positioned that, the longer sides of its generally rectangular shape are directed along the left-right direction of the vehicle (Z-axis direction). That is, the ribs 116 are provided along the shorter sides of the fuel cell casing 100. With such an arrangement, rigidity of the fuel cell casing 100 in the up-and-down direction (Y-axis direction) can be improved, as compared, with cases where the ribs 116 are provided along the longer sides of the fuel cell casing 100. As a result of this, the lower cover 115 can be thinned. Thus, the fuel cell system 10 can be housed in a place under the vehicle interior, which is a place having a relatively small space in the up-and-down direction (Y-axis direction).

Also, the extending direction of the ribs 116 is set so as to cross the stacking direction of the fuel-cell unit cells (Z-axis direction). Thus, external force in the stacking direction toward the fuel-cell unit cells can be absorbed.

Figure 4:
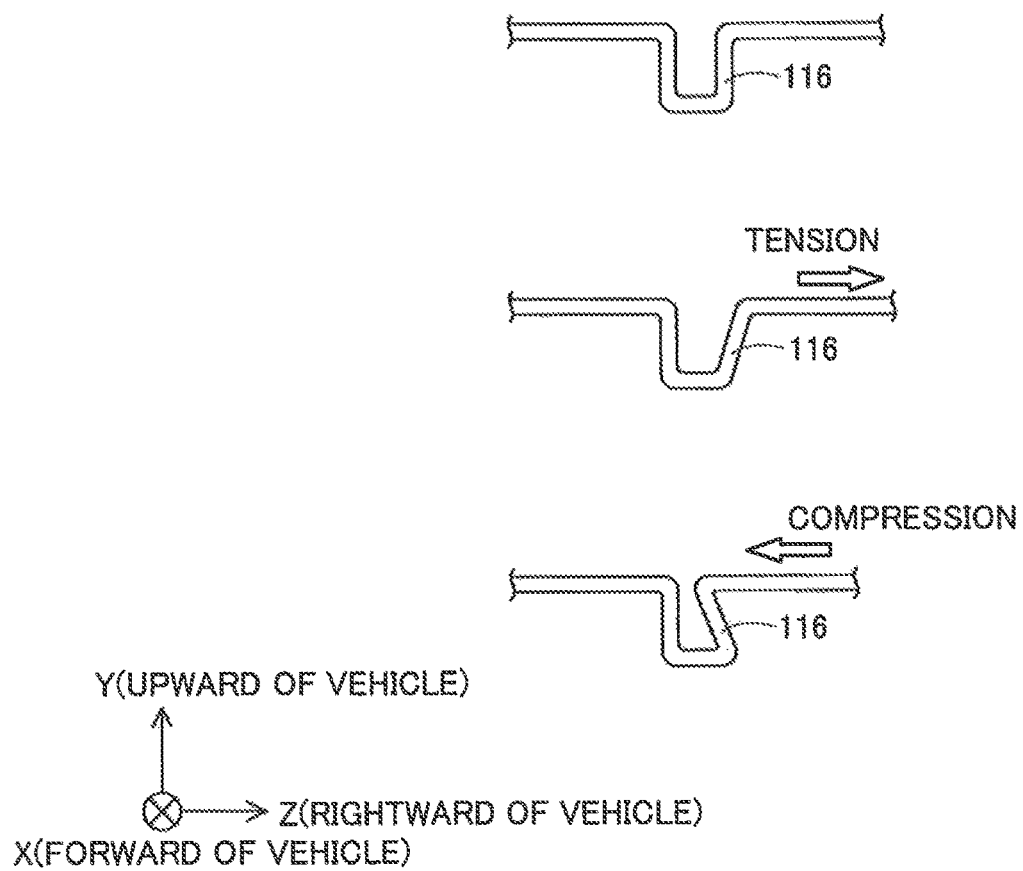
FIG. 4 is schematic views for explaining absorption of external force by ribs.

FIG. 4 is schematic views for explaining absorption of external force by the ribs 116. The topmost drawing shows a state in which no external force is applied in a horizontal direction to the ribs 118. The middle drawing shows a state in which a tensile-direction external force is applied in the horizontal direction to the ribs 116. In this case, the tensile-direction external force can be absorbed by the ribs 116 being elongated in the horizontal direction. The bottom drawing shows a state in which a compressional-direction external force is applied in the horizontal direction to the ribs 116. In this case, the compressional-direction external force can be absorbed by the ribs 116 being compressed in the horizontal direction.

Also, since the ribs 116 are formed so as to be protruded downward, recessed portions are formed on the top surface of the lower cover 115. Therefore, water in the fuel cell casing 100 can be stored therein.

Figure 5:
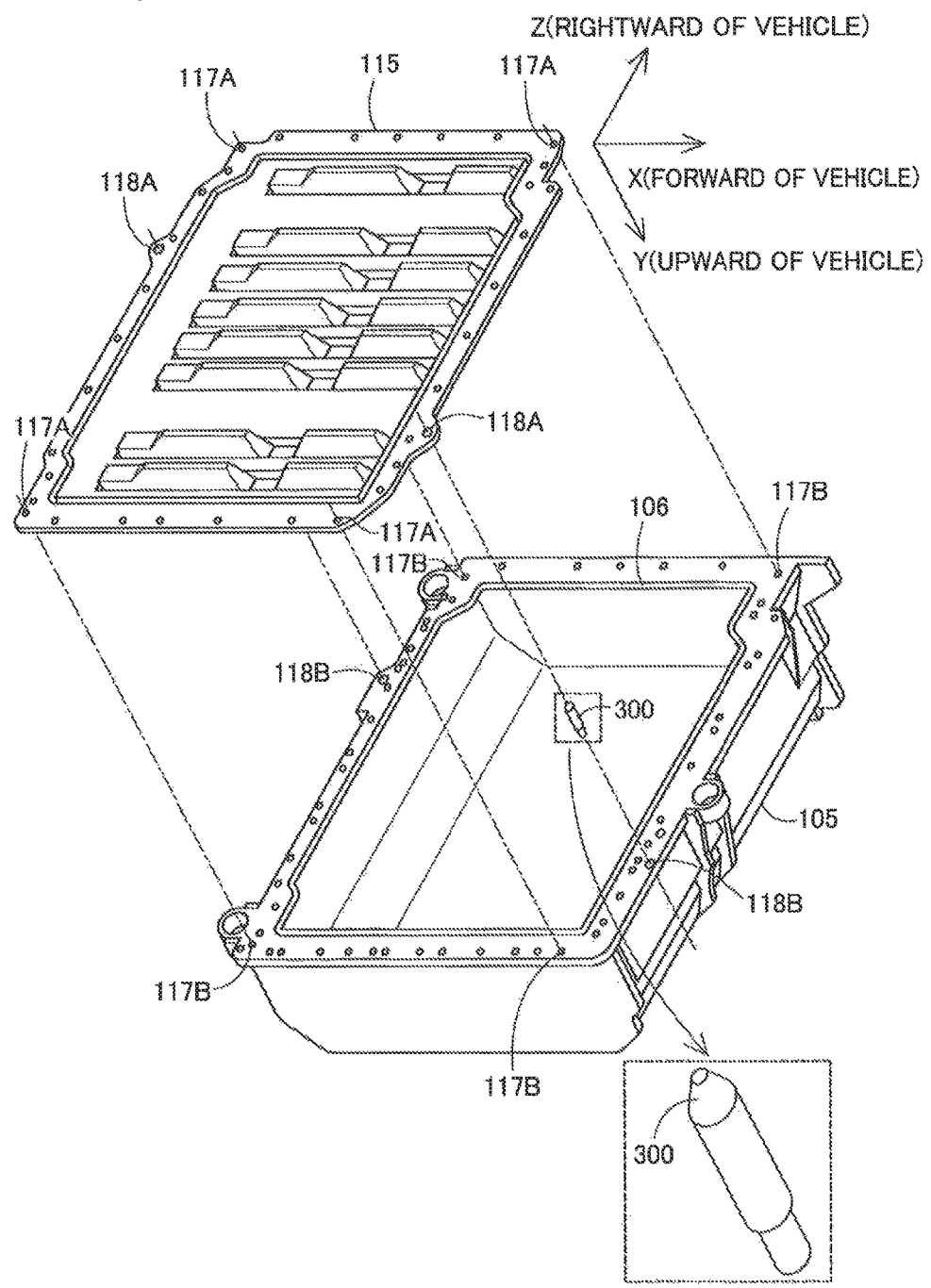
FIG. 5 is an explanatory view of a method for assembling together the lower cover and a stack casing.

FIG. 5 is an explanatory view of a method for assembling together the lower cover 115 and the stack casing 105. The lower cover 115 includes first holes 117A for use of fixation with the stack casing 105, which is another member of the fuel cell casing 100, and second holes 118A which are other than the first holes 117A and which are used for positioning relative to the stack casing 105. The stack casing 105 includes third holes 117B corresponding to the first holes 117A, and fourth holes 118B corresponding to the second holes 118A. In this figure, holes of the lower cover 115 with no signs added thereto are the first holes 117A, and holes of the stack casing 105 with no signs added thereto are the third holes 117B. In addition, a groove 106 for providing the gasket 107 is formed in the stack casing 105, and the gasket 107 (not shown in FIG. 5) is preparatorily inserted into the groove 106 of the stack casing 105 before positioning.

As to the assembling method, first, positioning of the lower cover 115 and the stack casing 105 is performed by using the second holes 118A and the fourth holes 118B. In this embodiment, a pin 300 is used, for the positioning.

Figure 6:
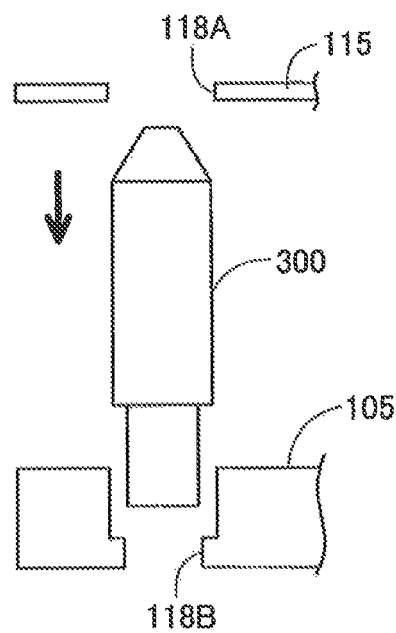

FIG. 6 is an explanatory view of a positioning method. First, the pin 300 is inserted into a fourth hole 118B of the stack casing 105. Next, with the pin 300 fixed to the stack casing 105, the pin 300 is inserted into a second hole 118A of the lower cover 115.

Without performing the positioning using the second hole 118A, after the lower cover 115 is temporarily placed on the stack casing 105, a position of the lower cover 115 relative to the stack casing 105 needs to be adjusted so as to accomplish an alignment between the positions of the first holes 117A of the lower cover 115 and the positions of the third holes 117B of the stack casing 105. During the process of this adjustment, there is a possibility that the gasket 107 may be rubbed or twisted or departed from the groove. The result of this may be such that the gasket 107 is not compressed as designed, with a degraded scalability of a gap between the stack casing 105 and the lower cover 115.

However, by performing the positioning using the second hole 118A, the possibility that the gasket 107 is rubbed or twisted or departed from the groove can be suppressed. As a result of this, such a possibility can be suppressed that the gasket 107 is not compressed as designed to lead to a degraded sealability of the gap between the stack casing 105 and the lower cover 115.

After the positioning, the first holes 117A of the lower cover 115 and the third boles 117B of the stack casing 105 are fixed (see FIG. 5). In this embodiment, bolts are used as the fixing jig. In this process, the pins 300 are inserted into the second hole 118A of the lower cover 115 and the fourth hole 118B of the stack casing 105. Therefore, unreasonable tightening due to a misalignment between the position of the first hole 117A and the lower cover 115 and the position of the third hole 117B of the stack casing 105 can be prevented. Thus, the working time can be shortened.

After the fixation, the pins 300 are removed from the second hole 118A of the lower cover 115 and the fourth hole 118B of the stack casing 105, by which the assembling is ended.

In a case where the first hole 117A to be used for the fixation and the second hole 118A to be used, for the positioning relative to the stack casing 105 are of the same hole, there is a possibility that using the hole, which is used for the positioning, for the fixation with use of the fixing jig may be forgotten. However, setting the first hole 117A and second hole 118A as different holes makes it possible to prevent such an occurrence.

Figure 7A:
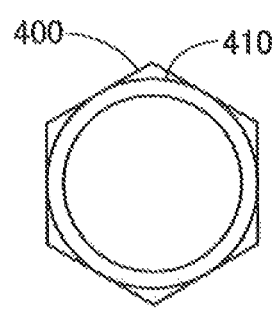
FIG. 7A is a schematic view showing a fixing jig for fixing the lower cover and the stack casing.
Figure 7B:
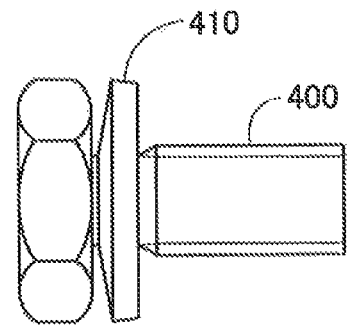
FIG. 7B is a schematic view showing a fixing jig for fixing the lower cover and the stack casing.

FIG. 7A and FIG. 7B are schematic views showing a fixing jig for fixing the lower cover 115 and the stack casing 105. In this embodiment, a bolt 400 with a conical spring washer 410 attached thereto is used as the fixing jig. FIG. 7A is a view as the bolt 400 with the conical spring washer 410 attached is viewed from the conical spring washer 410 side. FIG. 7B is a view as the bolt 400 with the conical spring washer 410 attached is viewed sideways. Advantages of using the bolt 400 with the conical spring washer 410 attached will be described below.

Figure 8A:
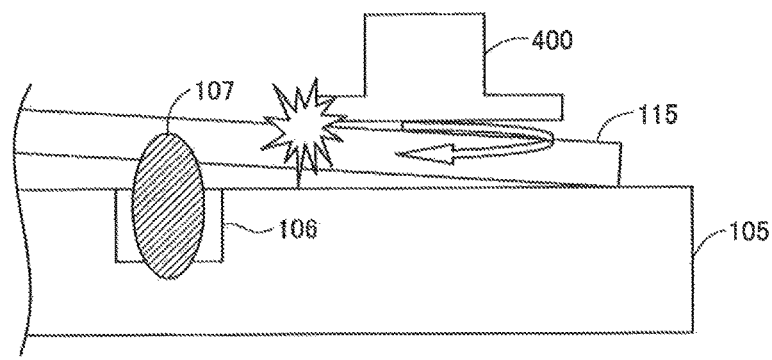
FIG. 8A is an explanatory view for explaining an advantage of using a bolt with a conical spring washer.
Figure 8B:
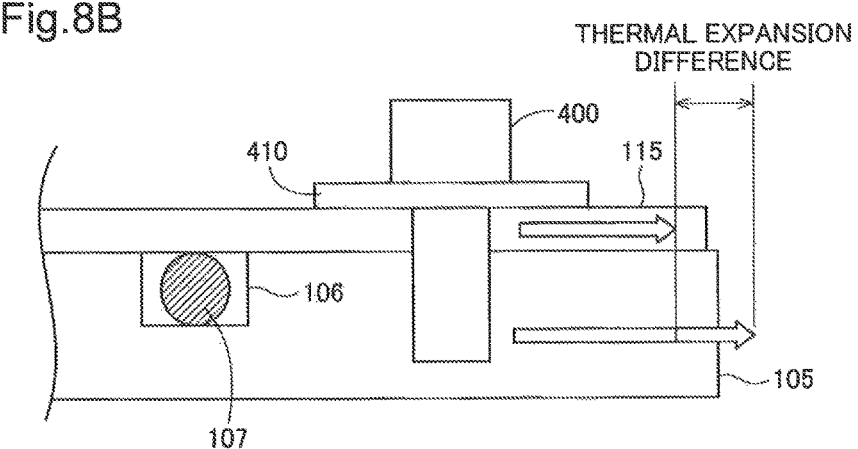
FIG. 8B is an explanatory view for explaining an advantage of using the bolt with a conical spring washer.

FIG. 8A and FIG. 8B are explanatory views for explaining an advantage of using the bolt 400 with the conical spring washer 410 attached. FIG. 8A shows a case where the lower cover 115 and the stack casing 105 are fixed, by using only the bolt 400 without using the conical spring washer 410. FIG. 8B shows a case where the lower cover 115 and the stack casing 105 are fixed by using the bolt 400 with the conical spring washer 410 attached.

The gasket 107 is used normally as it is compressed. Therefore, the gasket 107, if not preparatorily compressed, is protruded out of the groove 106 of the stack casing 105 (see FIG. 8A). When the gasket 107 is protruded out of the groove 106, the lower cover 115 is inclined as shown in FIG. 8A. As a result, the body of the lower cover 115 and paint applied to the lower cover 115 are scraped off by the flange of the bolt 400, force for tightening the bolt 400 is absorbed by fractional force. Also, scraped part of the lower cover 115 may corrode. For these reasons, there arises a need for equipment to compress the gasket 107 in the process of fixing the stack casing 105 and the lower cover 115.

On the other hand, in cases where the lower cover 115 and the stack casing 105 are fixed, and have been fixed, by using the bolt 400 with the conical spring washer 410 attached, the above-described problem can be suppressed. That is, with use of the conical spring washer 410, the lower cover 115, even though inclined in the process of fixation, comes into contact with the conical spring washer 410 and not with the flange of the bolt 400. As a result, since the conical spring washer 410 is a member independent of the bolt 400, an extent to which the lower cover 115 is scraped off during the tightening of the bolt 400 can be reduced. This effect can be produced not only when the bolt with the conical spring washer attached is used but also when a bolt with a plain washer attached is used.

In this embodiment, the stack casing 105 is formed from aluminum and the lower cover 115 is formed from iron. Therefore, as shown in FIG. 8B, the stack casing 105 and the lower cover 115 differ in coefficient of thermal expansion from each other. As a result, on condition that the stack casing 105 and the lower cover 115 have been fixed for a long period, the holt 400 comes to be loosened as a consequence of its expansion and contraction due to heat.

On the other hand, in cases where the lower cover 115 and the stack casing 105 are fixed, and have been fixed, by using the bolt 400 with the conical spring washer 410 attached, the above-described problem can be suppressed. That is, in the case where the stack casing 105 and the lower cover 115 have been fixed for a long time, even though the bolt 400 has come to be loosened as a consequence of its expansion and contraction due to heat, the conical spring washer 410 exerts force in the up-and-down direction, so that force for fixing the lower cover 115 and the stack casing 105 can be retained.

B. Modification

B1. Modification 1:

In the above embodiment, the pins 300 are used for positioning. However, the invention is not limited to this. Methods other than that in which pins are used to do positioning are exemplified by a method in which a jig for fixing the lower cover or the stack casing is provided with protruded portions and the protruded portions are inserted into holes of the lower cover and the stack casing to achieve the positioning.

B2. Modification 2:

In the above embodiment, holes to be used, for fixation and holes to be used for positioning are different ones. However, the invention is not limited to this.

Figure 9:
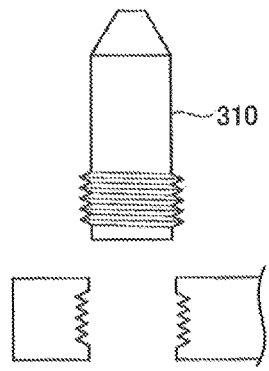
FIG. 9 is a schematic view showing an example in which holes to be used for fixation and holes to be used for positioning are of the same.

FIG. 9 is a schematic view showing an example in which holes to be used for fixation and holes to be used for positioning are of the same. That is, a threaded pin 310, which is retained to a hole of either the lower cover or the stack casing, is inserted into another hole of the other of the lower cover and the stack casing, by which a hole to be used for fixation can be used also as a hole to be used for positioning.

The present invention is not limited to the above-described embodiment and modifications and may be fulfilled in various configurations unless those configurations depart from the gist of the invention. For example, technical features in the embodiment and modifications corresponding to technical features in the individual aspects described in the section of Summary may be replaced or combined with one another, as required, in order to solve part or entirety of the above-described problems or to achieve part or entirety of the above-described advantageous effects. Moreover, those technical features may be deleted, as required, unless herein otherwise described as indispensable.

What is claimed is:

1. A fuel cell system mounted on a vehicle, comprising:
 a fuel cell configured to cause electrochemical reaction between an anode gas and a cathode gas to proceed; and
 a fuel cell casing that is configured to place the fuel cell therein, wherein
 the fuel cell casing has a bottom plate that is formed in an approximately rectangular shape,
 the fuel cell casing is positioned such that longitudinal sides of the approximately rectangular shape are parallel to a left-right direction of the vehicle,
 the bottom plate includes a flat portion and a rib that extends in a front-back direction of the vehicle, and
 the rib is formed in such a way that an upper face of the bottom plate is recessed and a lower face of the bottom plate is convex.

2. The fuel cell system in accordance with claim 1, wherein
 the fuel cell casing comprises a plurality of members including a member having the bottom plate, the member having:
 a first hole that is used to fix the member to another member of the fuel cell casing; and
 a second hole that is used to position the member relative to the another member of the fuel cell casing.

3. The fuel cell system in accordance with claim 2, wherein
 the member having the bottom plate and the another member of the fuel cell casing are fixed to each other by a bolt with a plain washer or a bolt with a conical spring washer.

* * * * *